United States Patent [19]

Katbi et al.

[11] Patent Number: 5,599,141
[45] Date of Patent: Feb. 4, 1997

[54] CHIP CONTROL INSERT

[75] Inventors: Karl Katbi, Troy; John Patterson, Hazel Park; Thomas Bernadic, Madison Hts.; Brendan Brockett, Dearborn Hts.; Tony Lowe, Royal Oak, all of Mich.

[73] Assignee: Valenite Inc., Madison Heights, Mich.

[21] Appl. No.: 603,017

[22] Filed: Feb. 16, 1996

Related U.S. Application Data

[63] Continuation of Ser. No. 205,466, Mar. 4, 1994, abandoned.

[51] Int. Cl.⁶ ..................................................... B23B 27/22
[52] U.S. Cl. .......................... 407/114; 407/115; 407/116; 407/42
[58] Field of Search .................................. 407/40, 42, 48, 407/61, 114, 115, 116

[56] References Cited

U.S. PATENT DOCUMENTS

| | | | |
|---|---|---|---|
| 3,786,541 | 1/1974 | Lundgren | 407/113 |
| 4,597,696 | 7/1986 | Maeda | 407/114 |
| 4,741,649 | 5/1988 | Mori | 407/114 |
| 5,082,401 | 1/1992 | Niebauer | 407/114 |
| 5,192,171 | 3/1993 | Ther | 407/114 |
| 5,324,144 | 6/1994 | Katbi | 407/114 |

*Primary Examiner*—Jack W. Lavinder
*Attorney, Agent, or Firm*—Mary K. Cameron

[57] ABSTRACT

A chip control insert is disclosed having positive, concave radiused chip breaker entry surfaces, and a locating surface which is equipped with a planar sealing surface and inclined, convex, radiused chip breaker ramp surfaces which undulate along the length of the insert. The intersection of the back ramp surface and the entry surface defines a chip groove. The locating surface has radial nose projections and radius bulges intermediate the length of the polygon sides of the insert.

6 Claims, 1 Drawing Sheet

CHIP CONTROL INSERT

This is a continuation of U.S. patent application Ser. No. 08/205,466, filed Mar. 4, 1994 and now abandoned.

BACKGROUND OF THE INVENTION

1. Field of the Invention.

The present invention relates to a chip control insert for cemented carbide and ceramic inserts.

The present invention further relates to a new design for a polygonal throwaway insert to turn, profile and bore ductile, as well as super alloy materials, at moderate to high cutting speeds at low feed rates and light depths of cuts.

The present invention further relates to a polygonal throwaway indexable insert which is adapted for use with international ISO screws for securing the insert in the tool pocket.

2. Description of the Related Art.

Ther et al., U.S. Pat. No. 5,192,171 discloses a chip control insert having parallel sides, a central aperture, and a diamond configuration. There is a planar recess below the peripheral cutting edge on each side of the insert. The insert is further equipped with a planar locating surface surrounding the central aperture with a substantial area recess intermediate the aperture and the locating surface. The locating surface has corner and intermediate radial projections with inclined side walls to provide chip breaking.

The chip breaking surfaces, as disclosed in FIGS. 2 through 6 of Ther et al., '171 are directed to a cutting edge, followed rearwardly by a planar neutral land, a planar descending entry surface, a planar floor and a planar ascending chip breaker surface. Bidirectional chip breaker surfaces are provided at the corner or nose portions of the insert.

This differs greatly from the configuration of the instant application. The chip entry surface of the instant application is concave radiused and descend in a positive manner below the periphery cutting edge of the insert. In addition, the chip breaker back wall of the instant invention is convexly radiused. There is no bidirectional chip breaker at each nose or corner potion of the insert. Accordingly, the instant invention differs from Ther et al., '171.

SUMMARY OF THE INVENTION

The present invention, as set forth in the claims and specification, is directed to a polygonal indexable cutting insert which is indexable and disposable. The insert is comprised of an upper surface and lower surface, which are generally parallel to each other, and are separated by a sidewall extending substantially unbroken therebetween to define a body. The sidewall is comprised of side flank portion, which are defined as that portion of the sidewall which extends from one corner of the insert to an adjacent corner of the insert. The sidewall intersects the upper surface, and this intersection with the upper surface defines the cutting edge which extend around the entire periphery of the insert. Immediately adjacent and rearward of the cutting edge is a positive, concave radiused cutting land entry surface descending from the cutting edge. The intersection of the entry surface and the back ramp surface forms a chip groove. A generally planar locating surface projects from the cutting land entry surface above the periphery of the insert. The locating surface surrounds a centrally located aperture which extends from the upper surface and exits from the lower surface. The locating surface has an inclined, convex radiused chip breaker ramp surface extending from said entry surface surface. The locating surface further has radial corner projections, and radius bulges intermediate each polygon side of the insert.

DETAILED DESCRIPTION OF THE PREFERRED EMBODIMENT

Figure 1:
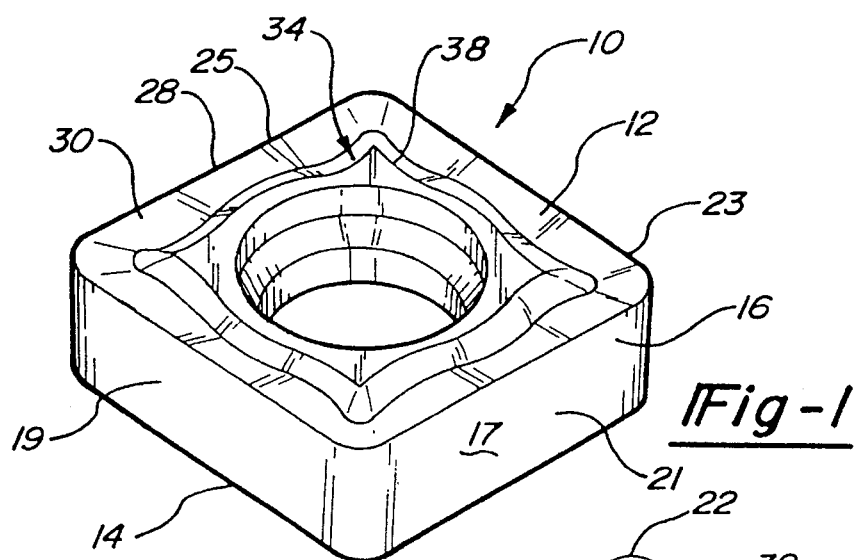
FIG. 1 is a three dimensional perspective view of the insert.
Figure 2:
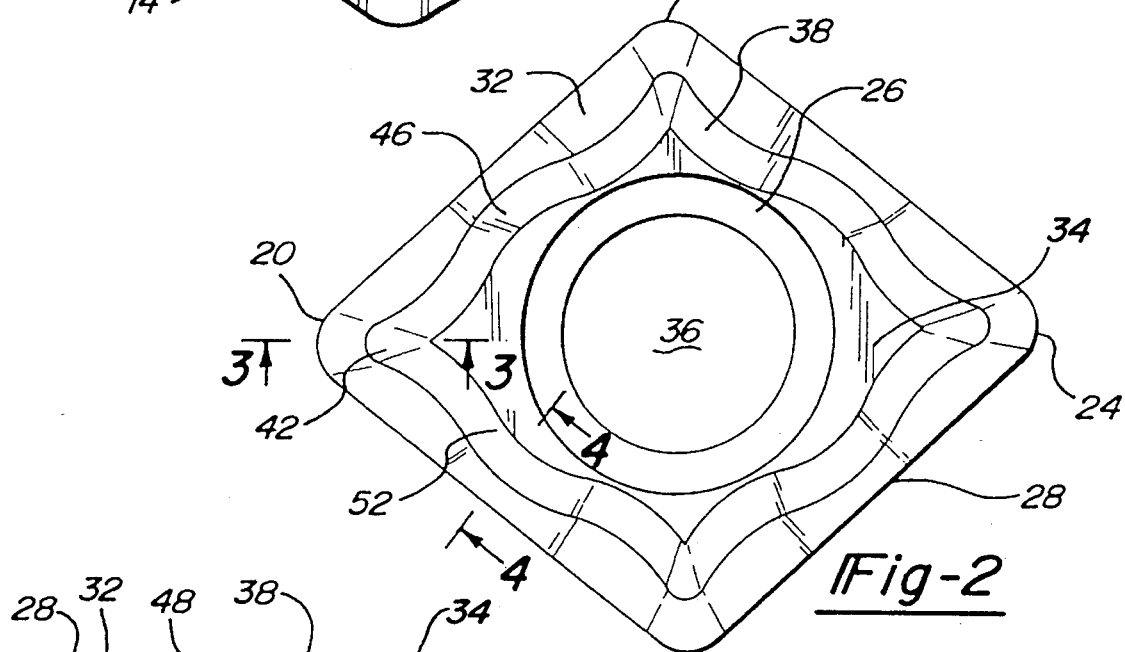
FIG. 2 is a top plan view of the insert.

Turning now to the drawings, wherein like numerals refer to like structures, and particular to FIGS. 1 and 2 there is shown insert 10, having upper surface 12 and lower surface 14. The upper and lower surfaces are generally planar and generally parallel to each other. The upper and lower surfaces are separated by sidewall 16, extending substantially unbroken therebetween to define body 17 of the inserts. The sidewall is comprised of side flanks, which extend from one corner to the adjacent corner of the insert. In the figures, a diamond shaped insert is depicted, having four corners 18, 20, 22, and 24. Thus it can be seen that side flanks 19, 21, 23, and 25 are defined in the manner set forth above. Those skilled in the art recognize that the number of side flank portions is dependent upon the number of sides that the polygonal insert has, and the insert described herein is merely for illustrative purposes and is not at all limiting as to the scope and spirit of the invention.

Figure 3:
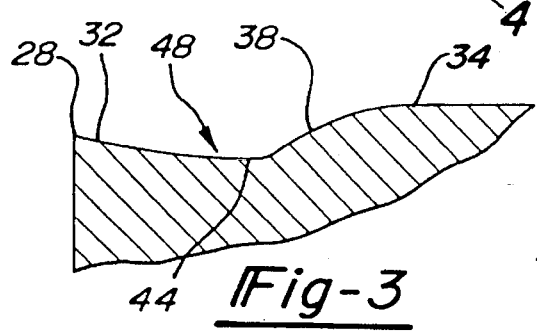
FIG. 3 is a sectional view of the insert taken along line 3—3 of FIG. 2.
Figure 4:
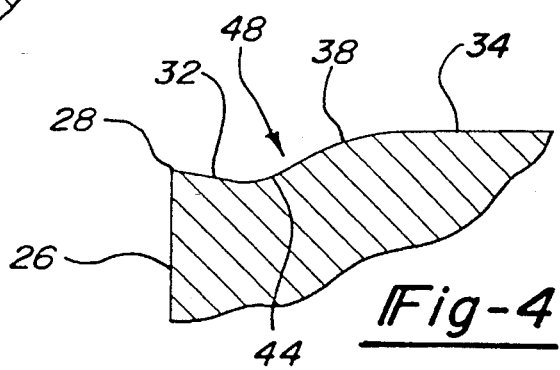
FIG. 4 is a sectional view of the insert taken along line 4—4 of FIG. 2.

The side wall intersects the upper surface to define a cutting edge 28 extending about the periphery 30 of the insert. Adjacent to and rearward of the cutting edge is positive concave radiused cutting land entry surface 32. The entry surface 32 has a radius of about 0.150 inches, and as seen in FIG. 3, descends in a positive direction relative to the cutting edge. The entry surface is not of uniform width along the periphery of the insert, but rather, as seen in FIGS. 2 through 4, varies in width along the periphery of the insert. Those skilled in the art will recognize that the insert may therefore be either positive or negative, depending upon the conditions in which the insert will be used.

Referring to FIGS. 1 and 2, a generally planar locating surface 34 projects from the cutting land entry surface 32 above the periphery cutting edge 28 of the insert. The locating surface intersects a boundery of an inclined, convex radial chip breaker ramp surface 38 extending from the entry surface 32 and intersecting the planar, locating surface 34. The chip breaker ramp surface 38 is further equipped with radial corner projections 42, and radius bulges 46 intermediate each polygon side of the insert.

The locating surface 34 surrounds a centrally located aperture 36 through the upper surface 12 and exiting through the lower surface 14 of the insert 10. The aperture may be provided with counter bore 26, to accommodate a fastener to secure the insert into the insert pocket of a tool holder. Preferably, the locating surface project 0.01 inches from said cutting land entry surface, and 0.006 inches above the insert periphery.

Turning now to FIGS. 3 and 4, it can be seen that the entry surface 32 and the ramp surface 38 intersect each other at radiused portion 44 to form chip groove 48. This radiused portion is provided to blend the positive radiused entry surface into the convex radiused chip breaker ramp surface 38. It is preferred that radiused portion 44 be 0.012 inches radiused.

In addition, it can be seen that the entry surface 32 is not of uniform width along the entire periphery of the insert. As seen in FIG. 3, taken along line 3—3 of FIG. 2, the entry surface is relatively wide at the respective corner portions of the insert, and undulates in width with the chip breaker ramp surface and the radial bulges 46. Thus, it can be seen that the width of the entry surface is narrowest at the intermediate portion taken along line 4—4 of FIG. 1, as further shown by reference to FIG. 4.

The insert thus described is equipped with a chip groove 48 which varies around the cutting edge. In this fashion, the chip groove is furthest from the cutting edge at the corners of the insert, where the chip entry surface is widest. This facilitates the use of the insert at small depths of cuts and light feed rates. The chip groove is nearest to the cutting edge at the radius bulges intermediate the polygon sides, where the chip entry surface is narrowest. This facilitates chip flow and enhances chip breakablity at medium feed rates and depths of cuts.

In addition, the configuration of the locating surface is such that at the radius bulges, chips are directed away from a work piece which serves to enhance chip breakability in secondary operations such as back facing and back boxing. The insert of the present invention is adapted for use at feed rates of about 0.002 to 0.015 IPS and at depths of cut of about 0.010 to 0.100 IPS.

Those skilled in the art will recognize that many variations are possible without departing from the scope and spirit of the invention as set forth in the appended claims.

We claim:

1. A polygonal indexable cutting insert, comprising: an upper surface and a lower surface in spaced relationship to each other and separated by a sidewall extending substantially unbroken therebetween to define a body; said sidewall intersecting said upper surface to define a cutting edge extending around a periphery of the insert; a concave radiused cutting land entry surface descending from said cutting edge and intersectining with an inclined, convex radiused chip breaker ramp surface which terminates in a generally planar locating surface on said upper surface projecting from said cutting land entry surface above said periphery; said chip breaker ramp surface intersecting said cutting land entry surface to define a continuous chip groove; said chip breaker ramp surface having radial corner projections and radius bulges intermediate to each polygon side.

2. A polygonal indexable cutting insert as claimed in claim 1, wherein said cutting land entry surface has a 0.150 inch radius.

3. A polygonal indexable cutting insert as claimed in claim 1, wherein said inclined chip breaker ramp surface has a 0.045 inch radius.

4. A polygonal indexable cutting insert as claimed in claim 1, wherein said chip breaker ramp surface and said cutting land entry surface intersect in a 0.0.12 inch radius.

5. A polygonal indexable cutting insert as claimed in claim 1, wherein said locating surface projects 0.01 inches from said cutting land entry surface.

6. A polygonal indexable cutting insert as claimed in claim 1, wherein said locating surface projects 0.006 inches above said cutting edge.

* * * * *